US007473172B2

(12) United States Patent
DeLozier

(10) Patent No.: US 7,473,172 B2
(45) Date of Patent: Jan. 6, 2009

(54) SYSTEM FOR EVALUATING BINGO CARD FACES

(75) Inventor: Gregory S. DeLozier, Wadsworth, OH (US)

(73) Assignee: Arrow International, Inc., Cleveland, OH (US)

( * ) Notice: Subject to any disclaimer, the term of this patent is extended or adjusted under 35 U.S.C. 154(b) by 465 days.

(21) Appl. No.: 10/920,480

(22) Filed: Aug. 18, 2004

(65) Prior Publication Data

US 2006/0040716 A1 Feb. 23, 2006

(51) Int. Cl.
*G06F 17/00* (2006.01)

(52) U.S. Cl. ........ 463/19

(58) Field of Classification Search ........ 463/19, 463/22; 273/279, 237; 708/212; 704/234
See application file for complete search history.

(56) References Cited

U.S. PATENT DOCUMENTS

| | | | | |
|---|---|---|---|---|
| 4,121,830 | A * | 10/1978 | Buckley | 463/22 |
| 4,312,511 | A * | 1/1982 | Jullien | 463/19 |
| 4,378,940 | A * | 4/1983 | Gluz et al. | 273/237 |
| 4,412,301 | A * | 10/1983 | Strubeck | 708/212 |
| 4,498,141 | A * | 2/1985 | Cooper | 708/212 |
| 4,882,688 | A | 11/1989 | Kondziolka et al. | |
| 4,885,700 | A | 12/1989 | Kondziolka et al. | |
| 5,054,787 | A * | 10/1991 | Richardson | 463/19 |
| 5,072,381 | A * | 12/1991 | Richardson et al. | 463/19 |
| 5,687,971 | A * | 11/1997 | Khaladkar | 273/269 |
| 5,951,396 | A * | 9/1999 | Tawil | 463/19 |
| 5,967,895 | A * | 10/1999 | Kellen | 463/19 |
| 6,280,325 | B1 * | 8/2001 | Fisk | 463/19 |
| 6,354,941 | B2 * | 3/2002 | Miller et al. | 463/19 |
| 6,401,063 | B1 * | 6/2002 | Hebert et al. | 704/234 |
| 6,599,188 | B2 * | 7/2003 | Hirsch et al. | 463/19 |
| 6,645,072 | B1 * | 11/2003 | Kellen | 463/19 |
| 6,875,105 | B1 * | 4/2005 | Behm et al. | 463/17 |
| 7,118,477 | B1 * | 10/2006 | Kellen | 463/19 |
| 2004/0077399 | A1 * | 4/2004 | Marshall | 463/19 |
| 2004/0077400 | A1 * | 4/2004 | Marshall | 463/19 |
| 2006/0040716 | A1 * | 2/2006 | DeLozier | 463/1 |
| 2007/0082726 | A1 * | 4/2007 | Marshall | 463/19 |
| 2007/0093286 | A1 * | 4/2007 | Marshall | 463/19 |

OTHER PUBLICATIONS

Arrow International, Inc., "Capitol Bingo Equipment—2004", Cover page and pp. 15-20.

* cited by examiner

*Primary Examiner*—Ronald Laneau
(74) *Attorney, Agent, or Firm*—Fay Sharpe LLP

(57) ABSTRACT

A method of evaluating a game face is provided. The face is defined by a matrix of first values, and the face is designated a winner when a combination of the first values forms a predetermined winning pattern in the matrix by matching second values selected during a game from a pool of values. The method includes: representing the combination of the face's first values corresponding to the winning pattern by a first array of data elements; monitoring the second values which are selected from the pool; representing the second values by a second array of data elements; combining the first array and the second array to generate a resulting third array of data elements; and, analyzing the third array to determine at least one of: (i) if the face is to be designated a winner; or, (ii) a rank of the face, wherein the rank is defined as a minimum number of second values that have to be selected from the pool for the face to be designated a winner.

27 Claims, 5 Drawing Sheets

| B | I | N | G | O |
|---|---|---|---|---|
| n=25 | n=20 | n=15 | n=10 | n=5 |
| n=24 | n=19 | n=14 | n=9 | n=4 |
| n=23 | n=18 | n=13 | n=8 | n=3 |
| n=22 | n=17 | n=12 | n=7 | n=2 |
| n=21 | n=16 | n=11 | n=6 | n=1 |

FIGURE 2

| B | I | N | G | O |
|---|---|---|---|---|
| 14 | 24 | 36 | 54 | 65 |
| 6 | 17 | 38 | 48 | 70 |
| 4 | 22 | FREE | 60 | 71 |
| 11 | 20 | 39 | 46 | 75 |
| 12 | 21 | 35 | 47 | 73 |

FIGURE 3

SYSTEM FOR EVALUATING BINGO CARD FACES

BACKGROUND

The present invention relates to the gaming arts. One embodiment finds particular application in conjunction with a game commonly known as Bingo, and the invention will be described with particular reference thereto. However, it is to be appreciated that various embodiments of the present invention are also amenable to other like applications and/or similar games of chance. One example of a similar game is Keno.

Bingo and Keno are widely known games of chance. A popular form of Bingo played in the United States consists of bingo faces defined by a two-dimensional (2D) matrix of numbers, e.g., a 5×5 matrix, with each column of numbers listed under a letter of the word "BINGO." Commonly, there is a pool of numbers, e.g., 1-75, that are used in the game. For example, under the letter "B", five unique numbers from 1 through 15 may be listed; under the letter "I", five unique numbers from 16 through 30 may be listed; under the letter "N", four unique numbers from 31 through 45 may be listed; under the letter "G", five unique numbers from 46 through 60 may be listed; and, under the letter "O", five unique numbers from 61 through 75 may be listed. The center space of the matrix, which falls under the "N" column, is usually designated as a free space in the play of the game.

The game is played by marking or filling in a Bingo face as corresponding numbers are called, drawn or otherwise selected from the pool, preferably, in a random or pseudo-random fashion. The face that first completes a designated pattern in the 2D matrix is the winner. For any given game, there may be one or more designated winning patterns. Numerous winning patterns are known. These include a row or column of the matrix or a diagonal across it. Also known are letters formed on the matrix such as an "X" or geometric patterns such as "picture frame" or "postage stamp."

It is popular in the playing of Bingo to purchase a booklet of Bingo sheets, each sheet of which has one or more Bingo faces printed thereon. These booklets often include multiple paper sheets, one stacked upon the other, with the paper sheets being removably secured at one edge to form a booklet. The number of sheets in a booklet is indicated by the term "up." Thus, a 10 up booklet means a booklet having ten sheets. Each sheet typically contains a number of bingo faces, indicated by the term "on." These normally range from a 1 ON to a 36 ON. When players enter the Bingo hall, they may purchase one or more booklets. Each booklet contains one sheet for each game to be played during that session. The player will then play all of the Bingo faces on the first sheet for the first game and mark these faces as each of the numbers is called. Once a winner is declared and the game is over, the player removes the top sheet from the booklet and plays the next game on the following sheet. The marked first sheet is discarded.

As the popularity of Bingo grows, the number of players increases dramatically. Each player may use twelve, eighteen or more Bingo faces simultaneously for a given game. As a result, 9,000 or more Bingo faces may be in play for a single game. State of the art communication techniques such as television satellite links may now join many Bingo halls together for a combined bingo session. This further increases the potential number of Bingo faces played in a single game to 120,000 or more. Determining a winner for a Bingo game can be burdensome and time consuming with so many faces, especially, if there are a plurality of patterns designated for winning. The potential for human error can also increase with the number of faces in play and/or the number of potential winning patterns. Accordingly, it is desirable to have a technique and/or device which will rapidly evaluate Bingo faces to accurately determine a winner.

The present invention contemplates a new and improved system for evaluating Bingo faces that overcomes the above-referenced problems and others.

SUMMARY

In accordance with one embodiment of the present invention, a method of evaluating a game face is provided. The face is defined by a matrix of first values, and the face is designated a winner when a combination of the first values forms a predetermined winning pattern in the matrix by matching second values selected during a game from a pool of values. The method includes: representing the combination of the face's first values corresponding to the winning pattern by a first array of data elements; monitoring the second values which are selected from the pool; representing the second values by a second array of data elements; combining the first array and the second array to generate a resulting third array of data elements; and, analyzing the third array to determine at least one of: (i) if the face is to be designated a winner; or, (ii) a rank of the face, wherein the rank is defined as a minimum number of second values that have to be selected from the pool for the face to be designated a winner.

In accordance with another embodiment of the present invention, a device is provided for evaluating a game face. The face is defined by a matrix of first values, and the face is designated a winner when a combination of the first values forms a determined winning pattern in the matrix by matching second values selected from a pool of values. The device includes: first storage means for storing the combination of the face's first values corresponding to the winning pattern such that it is represented as a first array of data elements; receiving means for receiving the second values which are selected from the pool; second storage means for storing the second values such that they are represented by a second array of data elements; combining means for combining the first array with the second array to generate a resulting third array of data elements; and, analyzing means for analyzing the third array to determine at least one of: (i) if the face is to be designated a winner; or, (ii) a rank of the face, wherein the rank is defined as a minimum number of second values that have to be selected from the pool for the face to be designated a winner.

In accordance with yet another embodiment of the present invention, a method is provided for evaluating a game face. The face is defined by a matrix of cells containing values, and the face is designated a winner when a combination of cells forms a determined winning pattern in the matrix by having their respective values match those selected during a game. The method includes: representing a winning pattern by a first bit mask; representing each of the face's cells by an associated pair of bit masks including a second bit mask that represents the value contained in the cell and a third bit mask that represents the location of the cell in the matrix; monitoring the values that are selected during the game; representing the values selected during the game by a fourth bit mask; generating a fifth bit mask by processing in turn each of the associated pairs of bit masks, the fifth bit mask representing a pattern formed in the face by those cells containing the values matching the values selected during the game; combining the first and fifth bit masks to generate a first result; and, analyzing the first result to determine if the face is to be designated a winner.

Numerous advantages and benefits of the inventive system and/or method for evaluating game card faces will become apparent to those of ordinary skill in the art upon reading and understanding the present specification.

BRIEF DESCRIPTION OF THE DRAWING(S)

The present invention may take form in various components and arrangements of components, and/or in various steps and arrangements of steps. The drawings are only for purposes of illustrating preferred embodiments and are not to be construed as limiting the invention.

FIG. 2 shows an example of a mapping scheme relating the squares or cells of a bingo card face to the bits in a bit mask used in accordance with aspects of the present invention.

FIG. 3 shows an example of a bingo card face used in accordance with aspects of the present invention.

DETAILED DESCRIPTION OF PREFERRED EMBODIMENT(S)

Figure 1:
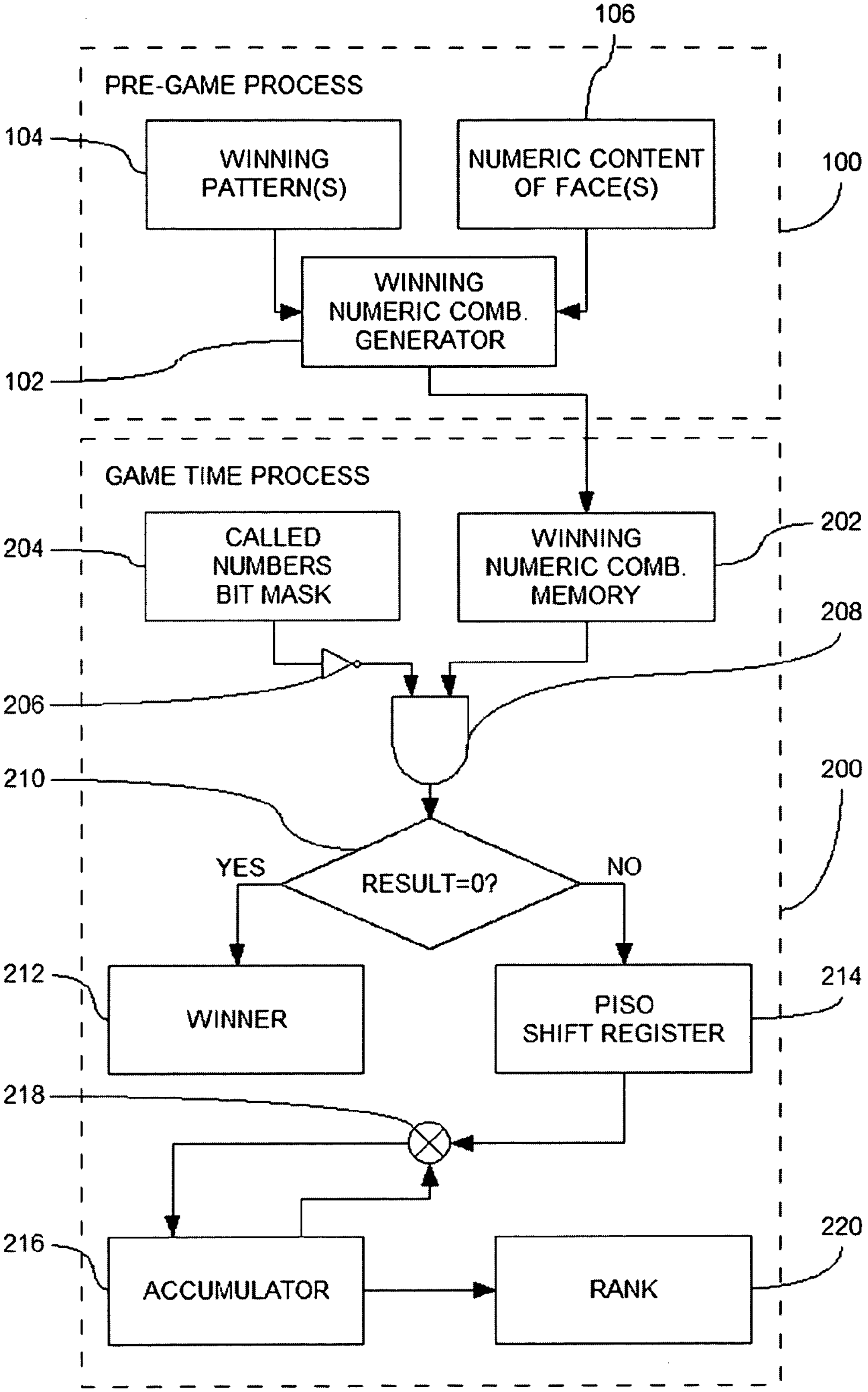
FIG. 1 is a box diagram showing an exemplary embodiment of a process for evaluating bingo card faces in accordance with aspects of the present invention.

With reference to FIG. 1, a box diagram illustrates an exemplary system for evaluating bingo card faces. The description below shall refer to the playing of one particular game, Bingo, however, it is to be appreciated that other games, such as Keno, and/or game variations can be similarly set-up and played by repeating the operations. The overall process is divided into two sub-processes, namely, a pre-game process 100 and a game time process 200. As the names suggest, the pre-game process 100 is suitably conducted to set-up the game, i.e., at some time prior to actual game play, and the game time process 200 is carried out during game play. Suitably, the processes are carried out by an appropriately programmed computer system, including, e.g., a display or touch screen, input/output devices such a keyboard and mouse, hard drive, memory, processor, optical and/or magnetic media drives, etc. Optionally, the computer is a handheld device or part of a Bingo console, as are commonly known in the art.

Referring now to the pre-game process 100, two sets of input are entered and/or loaded into a winning numeric combination generator 102. The inputs include one or more winning patterns 104 and the numeric content of the faces 106 that are going to be used in the subsequent game that is being set-up by the pre-game process 100. Suitably, each winning pattern input is represented by an array (e.g., a one-dimensional (1D) array) of binary digits, i.e., a binary number or a winning pattern bit mask. Each bit in the mask represents one square in a multi-dimensional (e.g., 2D) game card face. The bits are turned on and off in accordance an associated pattern on the face that defines a winning pattern for the game which is going to be played. For example, assuming a standard 5×5 Bingo card face, a winning pattern bit mask is a 25 bit mask with each of the 25 bits corresponding to a particular square on the face. For example, the least significant bit may represent square (5,5), the second least significant bit may represent square (5,4) and so on, as shown in FIG. 2, where the numbers n in the squares correspond to the bits in a winning pattern bit mask, with n=1 being the least significant bit, n=2 being the second least significant bit, and so on up to n=25 being the most significant bit. Note, for notation purposes only, herein the notation "square (x,y)" shall indicate the square or cell having the coordinates of column x and row y on the card face, where x is an integer starting at 1 for the left most column and progressively increasing by one for each next column to the right, and y is an integer starting at 1 for the top most row (not counting the heading row containing the letters B, I, N, G and O) and progressively increasing by one for each next column down. Additionally, while for purposes of clarity and simplicity, the forgoing example mapping shall be used throughout the specification, it is to be appreciated that the various bits of the winning pattern bit mask may represent the various squares or cells of the game card face in any suitable configuration or mapping.

The bits in each winning pattern bit mask are set to reflect a winning pattern on the face. Suitably, the bits in each winning pattern bit mask are either turned on (i.e., set equal to 1) to indicate that a corresponding square is part of the winning pattern or turned off (i.e., set equal to 0) to indicate that a corresponding square is not part of the winning pattern. Accordingly, for example, a winning pattern that is defined as the top horizontal row of squares is represented by the winning pattern bit mask:

1000010000100001000010000;

or a winning pattern that is defined as the middle vertical column of squares is represented by the winning pattern bit mask:

0000000000111110000000000;

and likewise for any other pattern defined as a winning pattern.

It is to be appreciated that for a given game there may be any number of patterns that are designed as winners. For example, there may be hundreds of winnings patterns, each with a corresponding winning pattern bit mask. However, in a majority of games, a dozen or fewer patterns are designated as winners, and in a substantial number of games there is only one winning pattern. In any event, each winning pattern has a corresponding winning pattern bit mask that is entered as the winning pattern input 104 into the winning numeric combination generator 102. Optionally, the winning pattern input 104 is stored in a file or database on a storage device, e.g., a hard disk, memory, optical or magnetic media read by a corresponding optical or magnetic disk drive, etc. For each game, the file or database contains one or more winning pattern bit masks corresponding to the winning patterns for that game. Alternately, the winning pattern bit masks for a game are entered manually via an input device and/or user interface including, e.g., a keyboard, mouse, graphical user interface (GUI), etc.

The numeric content of the game card faces being used in the game are the other input 106 to the winning numeric combination generator 102. The numeric content of each face is represented by a numeric content string (suitably, a 1D numeric content string) containing all the entries or values for each square of the face, listed in a set order corresponding to their location on the face. For example, each number on the face of the card is represented by a two-digit entry within the string. Suitably, the entries are concatenated and arranged such that, as one progresses left to right along from entry to neighboring entry, the corresponding locations of the entries on the face progress along in a set order, e.g., from top to bottom, starting with the left-most column (i.e., the B column) and then on to each successive column in order, i.e., through columns I, N, G and finally O. That is to say, each entry within the numeric content string maps to a particular location on the card face. By way of example, for the card face illustrated in FIG. 3, the numeric content string may look as follows:

14060411122417222021363800393554486046476570717573006656, where the last six digits "006656" are a serial number for the card face and the "00" in the middle represents the center free space, typically found on Bingo card faces. For each numeric content string, there is a corresponding ordered numeric content array (suitably, a 1D numeric content array). In the case of the standard 5×5 face, the numeric content array contains 25 elements. The numeric content array of this face is therefore [14, 6, 4, 11, 12, . . . , 71, 75, 73].

Each element in the numeric content array maps to a particular square on the card face. Suitably, the mapping is the same mapping used to relate the bits in the winning pattern bit mask to the squares on the face. That is to say, with respect to the present examples, the last or right most element in the numeric content array (i.e., the element having the value 73 in this example) corresponds to the square (5,5), the second to last element in the numeric content array (i.e., the element having the value 75 in this example) corresponds to the square (5,4), and so on. Likewise, as shown above the least significant bit of the winning pattern bit mask corresponds to the square (5,5), the second least significant bit of the winning pattern bit mask corresponds to the square (5,4), etc.

Optionally, the numeric content input 106 is stored in a file or database on a storage device, e.g., a hard disk, memory, optical or magnetic media read by a corresponding optical or magnetic disk drive, etc. For each game, the file or database contains one or more numeric content strings or numeric content arrays corresponding to the faces being played in that game. Alternately, the numeric content strings or numeric content arrays for a game are entered manually via an input device and/or user interface including, e.g., a keyboard, mouse, graphical user interface (GUI), etc.

The winning numeric combination generator 102 generates a collection of all the winning numeric combinations for a particular game from all the possible combinations of the inputs 104 and 106. That is to say, all the winning pattern bit masks are applied to and/or combined with each numeric content array for each face being played to generate all the winning numeric combinations for that face. More specifically, the bits in a winning pattern bit mask are paired with corresponding elements in a numeric content array for a given face. For example, the least significant bit in the winning pattern bit mask is paired with the last or right most element in the numeric content array; the second least significant bit is paired with the second to last or second right most element; and so on; with the most significant bit being paired with the first or left most element. For each pair then, depending on the bit setting, the corresponding element is included in or excluded from the generated winning numeric combination. That is to say, for example, if the bit setting in the pair is on or 1, then the element is included in the generated winning numeric combination, otherwise, if the bit setting in the pair is off or 0, then the element is not included in the generated winning numeric combination.

Figure 4:
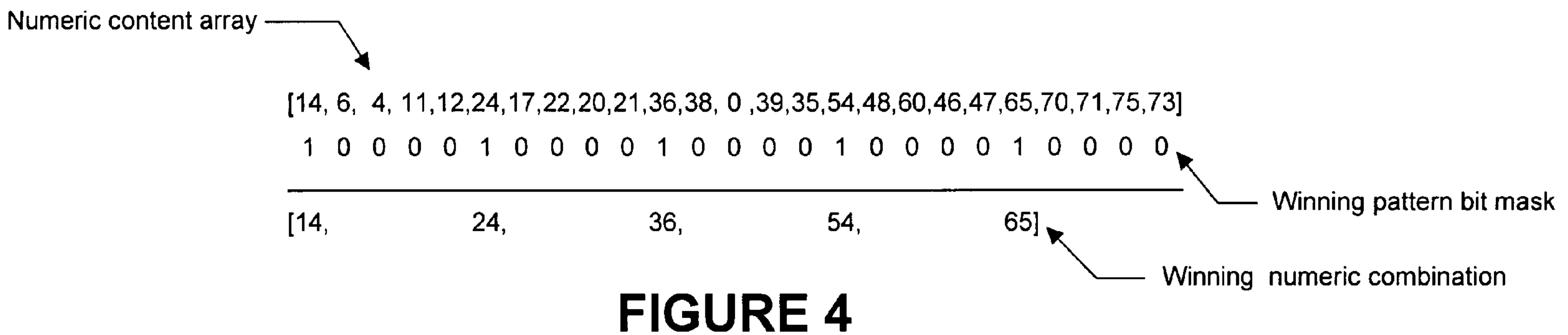
FIG. 4 illustrates an example of creating a winning numeric combination from an exemplary numeric content array and an exemplary winning pattern bit mask in accordance with aspects of the present invention.
Figure 5:
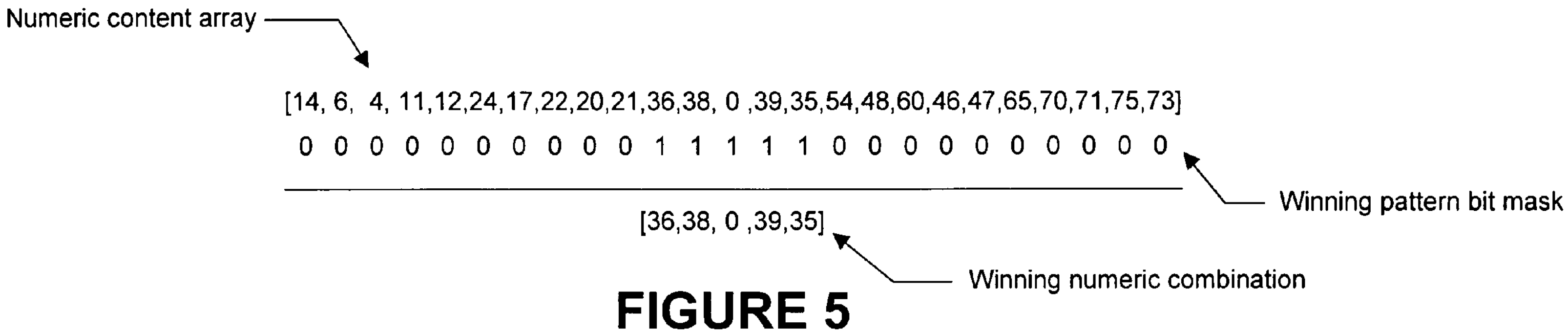
FIG. 5 illustrates an example of the creating another winning numeric combination from an exemplary numeric content array and an exemplary winning pattern bit mask in accordance with aspects of the present invention.

From the present examples, consider the face that has the numeric content array [14, 6, 4, 11, 12, . . . , 71, 75, 73], and two winning patterns having the winning pattern bit masks 1000010000100001000010000 and 0000000000111110000000000. Applying the first winning pattern bit mask to the numeric content array, as shown in FIG. 4, generates a first winning numeric combination of [14, 24, 36, 54, 65] for the face. Similarly, applying the second winning pattern bit mask to the numerical content array, as shown in FIG. 5, generates a second winning numeric combination of [36, 38, 00, 39, 35] for the face. Likewise, additional winning numeric combinations are generated for the face for each winning pattern bit mask input into the winning numeric combination generator 102. Moreover, sets of winning numeric combinations are similarly generated for each face (i.e., the numeric content string or array therefor) input into the winning numeric combination generator 102.

Each winning numeric combination is converted to or represented by a winning combination bit mask. Suitably, the winning combination bit mask has as many bits or binary digits as there are Bingo balls, plus 1. For example, in a typical Bingo game there are 75 numbered Bingo balls, so the winning combination bit mask in that case has 76 bits or binary digits. The extra bit accounts for the free space, represented by the value 0.

Figure 6:
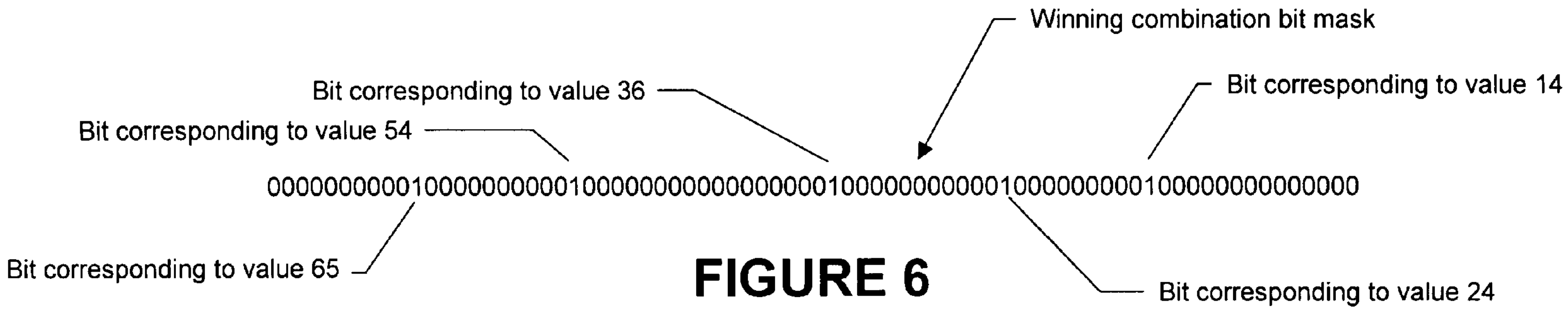
FIG. 6 shows an example of a winning combination bit mask used in accordance with aspects of the present invention.

The bits in the winning combination bit mask are set based upon which numbers are included in the winning numeric combination. For example, the least significant bit represents the 0 value or free space, the second least significant bit represents the 1 value, the third least significant bit represents the 2 value, and so on, up to the most significant bit which represents the 75 value. Suitably, in the winning combination bit mask, each bit is turned on (e.g., set to 1) or turned off (e.g., set to 0) to indicate respectively that its represented value is part of the winning numeric combination or is not part of the winning numeric combination. For example, the winning numeric combination of [14, 24, 36, 54, 65] has a corresponding winning combination bit mask as shown in FIG. 6.

Figures 7, 8, 9:
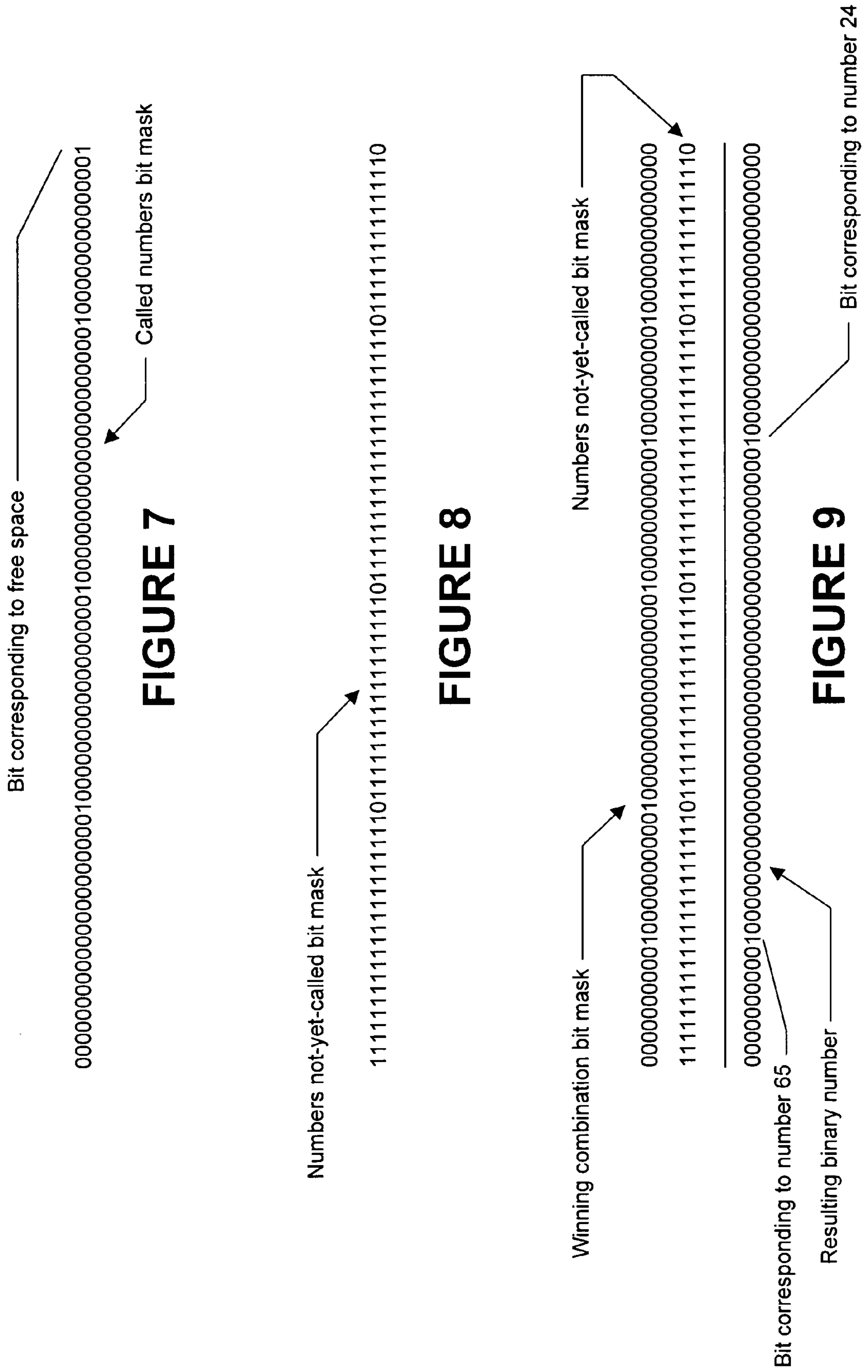
FIG. 7 shows an example of a called numbers bit mask used in accordance with aspects of the present invention.
FIG. 8 shows an example of a numbers not-yet-called bit mask used in accordance with aspects of the present invention.
FIG. 9 illustrates an example of creating a resulting binary number from an exemplary winning combination bit mask and an exemplary numbers not-yet-called bit mask in accordance with aspects of the present invention.

The winning combination bit masks are stored in a memory 202 or another suitable storage device, e.g., as a file or database on a hard disk or other magnetic or optical storage media readable by a corresponding magnetic or optical disk drive. Suitably, after all the winning combination bit masks have been generated and stored, the game time process 200 begins. In any well known manner, the Bingo game progresses by successively drawing numbered Bingo balls until a winner is determined. The numbers drawn are referred to as called numbers. A called numbers bit mask 204 tracks and/or records the called numbers. The called numbers bit mask 204 is essentially identical to a winning combination bit mask, except that the bits in the called numbers bit mask 204 are set based upon which Bingo balls are drawn (i.e., which numbers are called), rather than being based upon which numbers are included in a winning numeric combination. Suitably, in the called numbers bit mask 204, each bit is turned on (e.g., set to 1) or turned off (e.g., set to 0) to indicate respectively that a number has been called or has not been called. For example, consider the case where only balls 14, 36 and 54 have been drawn, then the called numbers bit mask is as shown in FIG. 7. Note, the least significant bit in the called numbers bit mask is turned on because it represents the free space or 0 value. In essence, the free space may be treated as a ball or number that is always drawn or called.

Suitably, after each ball is drawn, the called numbers bit mask 204 is updated by setting the bit corresponding to the called number. Each time the called numbers bit mask 204 is updated, the game time process 200 is executed for each winning combination bit mask stored in the memory 202. That is to say, the current called numbers bit mask 204 is logically negated bitwise, as indicated by the negating gate 206. The negated called numbers bit mask now represents the numbers which have not yet been called. For example, negating the exemplary called numbers bit mask shown in FIG. 7 gives the bit mask shown in FIG. 8. Note, the turned on bits as shown in FIG. 8 correspond to those numbered bingo balls that have yet to be drawn, i.e., the numbers that have yet to be called. Accordingly, it shall be referred to as the numbers not-yet-called bit mask.

Next, a winning combination bit mask from the memory 202 is bitwise logically ANDed with the numbers not-yet-called bit mask, as indicated by the AND gate 208. Again using the present examples (i.e., the winning numeric combination of [14, 24, 36, 54, 65] and the drawn balls including only 14, 36 and 54), ANDing the respective winning combination bit mask (FIG. 6) and the numbers not-yet-called bit mask (FIG. 8) looks as is shown in FIG. 9. Note, the turned on bits in the winning combination bit mask represent the numbers needed to win, while the turned on bits in the numbers not-yet-called bit mask represent the numbers that have not yet been called. Accordingly, in the resulting binary number, the turned on bits represent the numbers which are both needed to win and not yet called, namely, in this example, numbers 24 and 65.

At decision box 210, it is determined if the resulting binary number is equal to 0 (i.e., if all the bits are turned off). If the resulting binary number is in fact equal to 0, the face corresponding to the winning numeric combination being processed is the winner, as indicated by box 212. Note, if none of the bits in the resulting binary number are turned on, then there are no numbers which are both needed to win and not yet called. In other words, all the numbers needed to win have been called. On the other hand, if at least one bit in the resulting binary number is turned on, then at least one number remains which is both needed to win and not yet called.

In the case where the resulting binary number is not equal to 0, the face corresponding to the winning numeric combination being processed is not the winner. Suitably, in this instance, the rank of the face is determined. The rank represents how close a face is to winning. More specifically, the rank refers to the minimum number of squares on the face which have yet to be filled in for the face to win, i.e., the minimum number of numbers which need to be called for the face to win. Suitably, the rank is determined by totaling up the number of turned on bits in the resulting binary number. For example, the resulting binary number is first serialized, as indicated by loading the resulting binary number into a parallel-in serial-out (PISO) shift register 214. As each bit is output from the PISO shift register 214, it is added, as indicated by adder 218, together with the current value in an accumulator 216 (initially set to 0). The new value from the adder 218 is then entered and/or loaded back into the accumulator 216 to thereby update the same. Once all the bits have been processed in this manner, a reading of the accumulator's value provides the rank, as indicated by box 220.

As can be appreciated, for each new Bingo ball drawn in a game, the present system and/or process evaluates each potential winning combination of numbers. If a game has a number of winning patterns =i, and a number of faces being played =m, then the number of potential winning combinations of numbers to be evaluated =i×m. This can be a substantially large number. For example, it is not unreasonable, in an electronic game, for a single player to be playing 128 faces. Moreover, complex games, e.g., including up to 1000 different winning patterns, are popular with players. That means there may be as many as 128,000 winning combinations of numbers to evaluate per player each time a ball is drawn. Accordingly, so as not to slow the pace of the game, the present system and/or process is advantageously designed to provide rapid evaluations. Moreover, the relatively low processing power demands makes it particularly desirable for hand-held bingo and/or other computing devices where lower powered processors may typically be employed.

Figure 10:
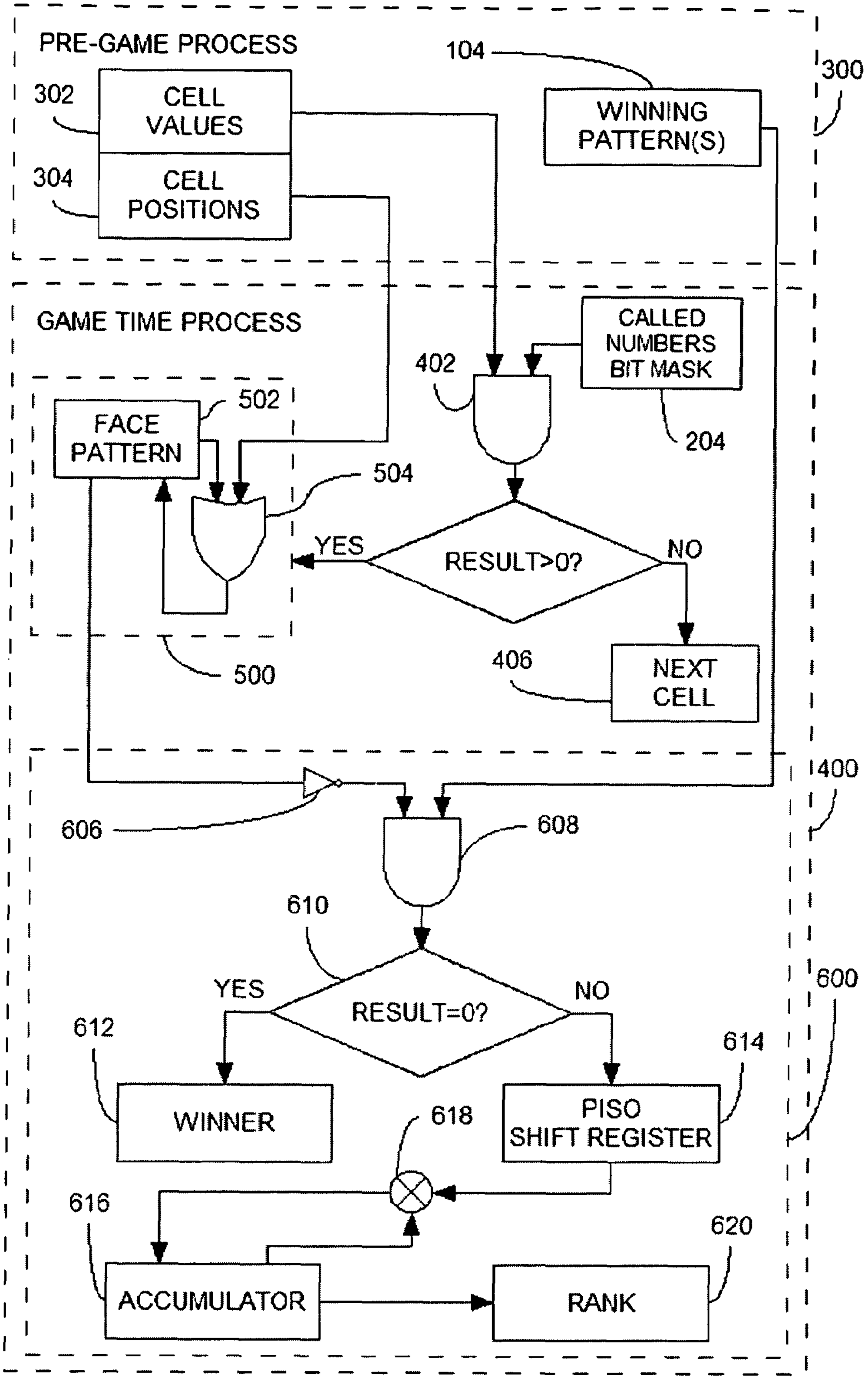
FIG. 10 is a box diagram showing another exemplary embodiment of a process for evaluating bingo card faces in accordance with aspects of the present invention.

With reference to FIG. 10, in another embodiment, the same winning pattern bit masks and called numbers bit mask are employed. In this embodiment, the system will again be described in terms of a pre-game process 300 and game time process 400. However, in this embodiment, the faces are input differently as compared to the above described embodiment. More specifically, each face is input as individual cells. Each individual cell is represented by a cell value bit mask and a cell position bit mask, as indicated by boxes 302 and 304. The cell value bit mask is essentially identical to a winning combination bit mask, except that only one value is represented in the cell value bit mask, namely, the value in the cell, rather than representing all the values in a winning numeric combination. Likewise, the cell position bit mask is essentially identical to a winning pattern bit mask, except that only one cell location is represented in the cell position bit mask, namely, the location of the cell, rather than representing all the locations that make up a winning pattern.

With reference back to FIG. 3, for example, the cell position bit masks corresponding to each cell or square location is given by a 25 bit mask having the $n^{th}$ bit from the right turned on or set equal 1 and all other bits turned off or set equal to 0. Suitably, the cell value bit masks have as many bits or binary digits as there are bingo balls, plus 1. For example, in a typical bingo game there are 75 numbered bingo balls, so the cell value bit masks in that case have 76 bits or binary digits. The extra bit accounts for the free space, represented by the value 0. The bits in the cell value bit mask are set based upon which value is represented thereby. For example, the least significant bit represents the 0 value or free space, the second least significant bit represents the 1 value, the third least significant bit represents the 2 value, and so on, up to the most significant bit which represents the 75 value. Suitably, in the cell value bit mask, one bit is turned on (e.g., set to 1) and the rest are turned off (e.g., set to 0) to indicate the represented value. Accordingly, for each 5×5 card face, there are 25 associated pairs of cell value and cell position bit masks.

Suitably, prior to the start of game play, the associated cell value and cell position bit mask pairs for each face being played are stored in a file or database on a storage device, e.g., a hard disk, memory, optical or magnetic media read by a corresponding optical or magnetic disk drive, etc. Alternately, they are entered manually via an input device and/or user interface including, e.g., a keyboard, mouse, graphical user interface (GUI), etc.

As the game is being played, the called numbers bit mask is updated each time a new Bingo ball is drawn. Each time the called numbers bit mask is updated, all the faces being played are evaluated. Evaluation of a face involves processing all the cells of that face to generate a face pattern bit mask, e.g., indicated by box 502. The face pattern bit mask is essentially identical to a cell position bit mask, except that is starts out empty (i.e., all bits turned off or set to 0) at the beginning of a face's evaluation and during the face's evaluation it tracks and/or records the location of the cells or squares in the face that have a right to be filled or daubed (i.e., that have the same value as a called number). For example, when applied iteratively to each cell of a face, the following pseudo code generates a face pattern mask therefor:

if cell_value_mask[k] AND called_numbers_mask>0 then Face_pattern_mask=face_pattern_mask OR cell_position_mask[k]

where cell_value_mask[k] is the cell value bit mask (e.g., indicated by box 302) for the $k^{th}$ cell of the face; called_numbers_mask is the called numbers bit mask (e.g., indicated by box 204); face_pattern_mask is the face pattern bit mask (e.g., indicated by box 502), initially having all bits turned off or set to 0; cell_position_mask[k] is the cell position bit mask (e.g., indicated by box 304) for the $k^{th}$ cell of the face; AND (e.g., indicated by AND gate 402) is a bitwise logical AND operator; and OR (e.g., indicated by OR gate 504) is a bitwise logical OR operator.

That is to say, when a face is evaluated, all the cells of that face (e.g., a first cell, second cell, third cell, and so on, each represented by a cell value and cell position pair of bit masks) are in turn processed to generate the face pattern bit mask. Suitably, the face pattern bit mask initially starts cleared (i.e., all bits turned off or set to 0) and is updated with the processing of each cell until all the cells for a given face have been processed. With reference again to FIG. 10, the cell value bit mask of the cell being processed is bitwise logically ANDed with the called numbers bit mask, indicated by AND gate 402. If the cell value bit mask and the called number bit mask both have a common bit turned on or set to 1, then the resulting binary number from AND gate 402 will be greater than 0 (indicating that the value represented by the cell value bit mask has been called), otherwise it will be equal to 0 (indicating that the value represented by the cell value bit mask has not been called). Accordingly, at decision box 404, it is determined if the result is greater than 0. If it is not, the next cell is processed without updating the face pattern bit mask, as indicated by box 406. If the result is greater than 0, then the face pattern bit mask is updated, indicated by sub-process 500.

Suitably, to update the face pattern bit mask, the current face pattern bit mask is bitwise logically ORed with the cell position bit mask of the cell being processed, indicated by OR gate 504. The result from the OR gate 504 is then entered and/or loaded back into box 502 to thereby update the face pattern bit mask.

Note, each update of the face pattern bit mask has the effect of turning on or setting to 1 that bit in the face pattern bit mask which matches the bit in the cell position bit mask representing the location where the corresponding value is on the face. Accordingly, after the final update of the face pattern bit mask (i.e., after all the cells in a face have been processed), the face pattern bit mask represents all the cell locations within the face which have a right to be filled or daubed. In other words, each bit in the face pattern bit mask corresponding to a cell location having the value of a called number is turned on or set to 1, and each bit in the face pattern bit mask corresponding to a cell location having the value of a number not called is turned off or set to 0.

Sub-process 600 is essentially the same as the process carried out by elements 206 through 220 of FIG. 1, except with different starting inputs. When the last cell of a face has been processed and the face pattern bit mask has completed updating, it is determined if the face is a winner, indicated generally as sub-process 600. As there may be multiple winning patterns, and hence multiple winning pattern bit masks, the sub-process 600 is iteratively carried out with each winning pattern bit mask in turn to evaluate the face against all the possible winning patterns. Sub-process 600 begins by reading the face pattern bit mask and logically negating it bitwise, as indicated by the negating gate 606. The negated face pattern bit mask now represents the cell locations which do not have a right to be daubed. That is to say, the turned on bits in the negated face pattern bit mask correspond to those cell locations having values of numbered bingo balls that have not yet been drawn, i.e., values that have not yet been called. Accordingly, it shall be referred to as the inverse face pattern bit mask.

Next, the inverse face pattern bit mask is bitwise logically ANDed with a winning pattern bit mask, as indicated by the AND gate 608. Note, the turned on bits in the winning pattern bit mask represent the cell locations needed to win, while the turned on bits in the inverse face pattern bit mask represent the cell location that do not have a right to be daubed. Accordingly, in the resulting binary number from AND gate 608, the turned on bits represent the cell locations which are both needed to win and do not have a right to be daubed yet.

At decision box 610, it is determined if the resulting binary number from the AND gate 608 is equal to 0 (i.e., if all the bits are turned off). If the resulting binary number is in fact equal to 0, the face being processed is the winner, as indicated by box 612. Note, if none of the bits in the resulting binary number from the AND gate 608 are turned on, then there are no cell locations which are both needed to win and do not have a right to be daubed. In other words, all the cell locations needed to win have a right to be daubed. On the other hand, if at least one bit in the resulting binary number from the AND gate 608 is turned on, then at least one cell location remains which is both needed to win and does not yet have the right to be daubed.

In the case where the resulting binary number from AND gate 608 is not equal to 0, the 2D face being processed is not the winner with respect to the winning pattern it is being checked against. Suitably, in this case, the face's rank with respect to the winning pattern is determined. The rank with respect to the winning pattern represents how close a face is to matching the winning pattern under consideration. More specifically, rank with respect to the winning pattern refers to the minimum number of squares on the face which have yet to be filled in or daubed for the face to match the winning pattern under consideration. Suitably, the rank with respect to the winning pattern is determined by totaling up the number of turned on bits in the resulting binary number from the AND gate 608. For example, the resulting binary number from the AND gate 608 is first serialized, as indicated by entering and/or loading the same into a parallel-in serial-out (PISO) shift register 614. As each bit is output from the PISO shift register 614, it is added, as indicated by adder 618, together with the current value in an accumulator 616 (initially set to 0). The new value from the adder 618 is then entered and/or loaded back into the accumulator 616 to thereby update the same. Once all the bits have been processed in this manner, a reading of the accumulator's value provides the rank with respect to the winning pattern, as indicated by box 620. The overall rank of the face is then taken as the minimum of the all the ranks with respect to each winning pattern.

In this embodiment, as with the prior embodiment, the present system and/or process is advantageously designed to provide rapid evaluations. However, relative to the prior embodiment, storage space has been conserved to the extent that some pre-game computations or processing have been foregone. In particular, all the possible winning numeric combinations for all the faces are not computed or processed prior to game play, thereby freeing that amount of storage room which would otherwise be used to hold the same. This may be particularly desirable for hand-held Bingo and/or other computing devices where lower storage capacity may typically be available.

While describe by way of example to a 2D bingo card face, it is to be appreciated that the inventive aspects disclosed herein are equally applicable and can be readily extended to cards defined by matrixes of other dimensions (e.g., 3D) with similar advantages being achieved via processing of the various representative arrays in lower dimensions.

It is also to be appreciated that in connection with the particular exemplary embodiments presented herein certain structural and/or function features are described as being incorporated in, and/or with, defined elements and/or components. However, it is contemplated that these features may, to the same or similar benefit, also likewise be incorporated in, and/or with, other elements and/or components and/or in other various embodiments where appropriate. It is also to be appreciated that different aspects of exemplary embodiments may be selectively mixed and matched as appropriate to achieve other alternate embodiments suited for desired applications, the other alternate embodiments thereby realizing the respective advantages of the aspects incorporated therein.

Further, it is to be appreciated that particular features, operations, elements or components described herein may have their functionality suitably implemented via hardware, software, firmware or a combination thereof. Additionally, it is to be appreciated that certain features, elements or components described herein as incorporated together may under suitable circumstances be implemented as stand alone features, elements or components or otherwise divided. Similarly, a plurality of particular operations and/or functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of evaluating a game face, wherein said face is defined by a matrix of first values, and the face is designated a winner when a combination of the first values forms a predetermined winning pattern in the matrix by matching second values selected during a game from a pool of values, said method comprising:

a) representing the combination of the face's first values corresponding to the winning pattern by a first array of data elements;

b) monitoring the second values which are selected from the pool;

c) representing the second values by a second array of data elements;

d) combining the first array and the second array to generate a resulting third array of data elements; and, e) analyzing the third array to determine at least one of: (i) if the face is to be designated a winner; or, (ii) a rank of the face, wherein the rank is defined as a minimum number of second values that have to be selected from the pool for the face to be designated a winner;

wherein the first and second arrays each include at least one data element corresponding to each value in the pool.

2. The method of claim 1, wherein the data elements are bits.

3. The method of claim 2, wherein the first array includes a bit corresponding to each value in the pool, and the second array includes a bit corresponding to each value in the pool.

4. The method of claim 3, wherein a first bit level in the first array indicates that a first value corresponding to that bit's location in the array is in the winning pattern and a second bit level in the first array indicates that a first value is not in the winning pattern.

5. The method of claim 4, wherein a first bit level in the second array indicates that a second value has been selected and a second bit level in the second array indicates that a second value has not been selected.

6. The method of claim 5, wherein the first bit levels are the same for both the first and second arrays, and the second bit levels are the same for both the first and second arrays.

7. The method of claim 6, wherein the second array is logically inverted before the first and second arrays are combined.

8. The method of claim 7, wherein the combining includes logically ANDing the first and second arrays together to generate the third array.

9. The method of claim 8, wherein the face is determined to be a winner when all the bits in the third array have a bit level equal to the second bit level.

10. The method of claim 9, wherein the rank of the face is determined when the face is not determined to be a winner.

11. The method of claim 10, wherein the rank is determined by adding up the number of bits in the third array that have a bit level equal to the first bit level.

12. The method of claim 1, wherein the matrix is a multi-dimensional matrix and the first, second and third arrays are one-dimensional arrays.

13. The method of claim 12, wherein the matrix is a two-dimensional matrix.

14. A device for evaluating a game face, wherein said face is defined by a matrix of first values, and the face is designated a winner when a combination of the first values forms a determined winning pattern in the matrix by matching second values selected from a pool of values, said device comprising:

first storage means for storing the combination of the face's first values corresponding to the winning pattern such that it is represented as a first array of data elements;

receiving means for receiving the second values which are selected from the pool;

second storage means for storing the second values such that they are represented by a second array of data elements;

combining means for combining the first array with the second array to generate a resulting third array of data elements; and, analyzing means for analyzing the third array to determine at least one of: (i) if the face is to be designated a winner; or, (ii) a rank of the face, wherein the rank is defined as a minimum number of second values that have to be selected from the pool for the face to be designated a winner;

wherein the first and second arrays each include at least one data element corresponding to each value in the pool.

15. The device of claim 14, wherein the first and second storage means are each selected from a computer memory, a magnetic disk or an optical disk.

16. The device of claim 14, wherein the data elements are bits.

17. The device of claim 16, further including inverting means for logically inverting the second array before it is combined with the first array.

18. The device of claim 16, wherein the combining means logically ANDs the first and second arrays together.

19. The device of claim 16, further including accumulating means for adding up bits in the third array to determine the rank of the face.

20. The device of claim 14, wherein the combining means and analyzing means comprise a computer.

21. The device of claim 14, wherein the matrix is a multi-dimensional matrix and the first, second and third arrays are one-dimensional arrays.

22. The device of claim 21, wherein the matrix is a two-dimensional matrix.

23. A method of evaluating a game face, wherein said face is defined by a matrix of cells containing values, and the face is designated a winner when a combination of cells forms a determined winning pattern in the matrix by having their respective values match those selected during a game, said method comprising:

a) representing a winning pattern by a first bit mask;

b) representing each of the face's cells by an associated pair of bit masks including a second bit mask that represents the value contained in the cell and a third bit mask that represents the location of the cell in the matrix;

c) monitoring the values that are selected during the game;

d) representing the values selected during the game by a fourth bit mask;

e) generating a fifth bit mask by processing in turn each of the associated pairs of bit masks, said fifth bit mask representing a pattern formed in the face by those cells containing the values matching the values selected during the game;

f) combining the first and fifth bit masks to generate a first result; and, g) analyzing the first result to determine if the face is to be designated a winner.

24. The method of claim 23, wherein the fifth bit mask is iteratively updated upon the processing of each cell, step (e) comprising:

for each cell in turn;

i) combining the second bit mask and the fourth bit mask to generate a second result; and, ii) based on the second result, combining the fifth bit mask and the third bit mask to update the fifth bit mask.

25. The method of claim 24, where combining the second and fourth bit masks includes logically ANDing them bitwise with one another.

26. The method of claim 24, wherein combining the fifth and third bit masks includes logically ORing them bitwise with one another.

27. The method of claim 23, wherein combining the first and fifth bit masks includes logically ANDing them bitwise with one another.

* * * * *